(12) United States Patent
Steele

(10) Patent No.: US 6,987,378 B1
(45) Date of Patent: Jan. 17, 2006

(54) OVER-VOLTAGE PROTECTION CIRCUIT AND METHOD THEREFOR

(75) Inventor: Jeremy F. Steele, Pawtucket, RI (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 11/001,962

(22) Filed: Dec. 2, 2004

(51) Int. Cl.
*G05F 1/10* (2006.01)

(52) U.S. Cl. .......................... 323/222; 323/224

(58) Field of Classification Search ................ 323/222, 323/224, 282, 274
See application file for complete search history.

(56) References Cited

U.S. PATENT DOCUMENTS

| | | | | |
|---|---|---|---|---|
| 5,359,280 A | * | 10/1994 | Canter et al. .............. 323/282 |
| 5,359,281 A | * | 10/1994 | Barrow et al. .............. 323/284 |
| 5,818,707 A | * | 10/1998 | Seong et al. ................. 363/89 |
| 6,686,725 B1 | * | 2/2004 | Choi et al. .................. 323/207 |
| 6,756,771 B1 | * | 6/2004 | Ball et al. ................... 323/222 |
| 6,936,997 B2 | * | 8/2005 | Mullett ....................... 323/222 |

OTHER PUBLICATIONS

Maxim, High_Efficiency,Quad Output, Main Power-Supply Controllers for Notebook Computers, Maxim Integrated Products, Data Sheet 19-2187, Rev. 0; Apr. 2002.

* cited by examiner

*Primary Examiner*—Bao Q. Vu
(74) *Attorney, Agent, or Firm*—Robert F. Hightower

(57) ABSTRACT

In one embodiment, an over-voltage protection circuit of a power supply system disables an upper power transistor of an output stage of the power supply system responsively to an over-voltage condition on an output voltage of the power supply system. Subsequently, the over-voltage protection circuit alternately enables and disables a lower power transistor of the output stage responsively to respective first and second value of the output voltage.

20 Claims, 3 Drawing Sheets

OVER-VOLTAGE PROTECTION CIRCUIT AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form switching power supply controllers. In most cases, the switching power supply controllers included an over-voltage protection circuit to protect the controller and the load from over-voltage conditions in the output voltage. Typically a lower power transistor was enabled during the over-voltage condition in order to quickly discharge the output inductor of the power supply. During the discharge, the energy stored in the inductor sometimes caused the output voltage to go negative. The negative going voltage often resulted in damaging the load and damaging the semiconductor device that was driving the inductor. One example of such a power supply controller was a MAX1777 produced by Maxim Integrated Products of Sunnyvale Calif.

Accordingly, it is desirable to have an over-voltage protection circuit that protects the semiconductor device from the over-voltage condition, and that does not cause a negative load voltage.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
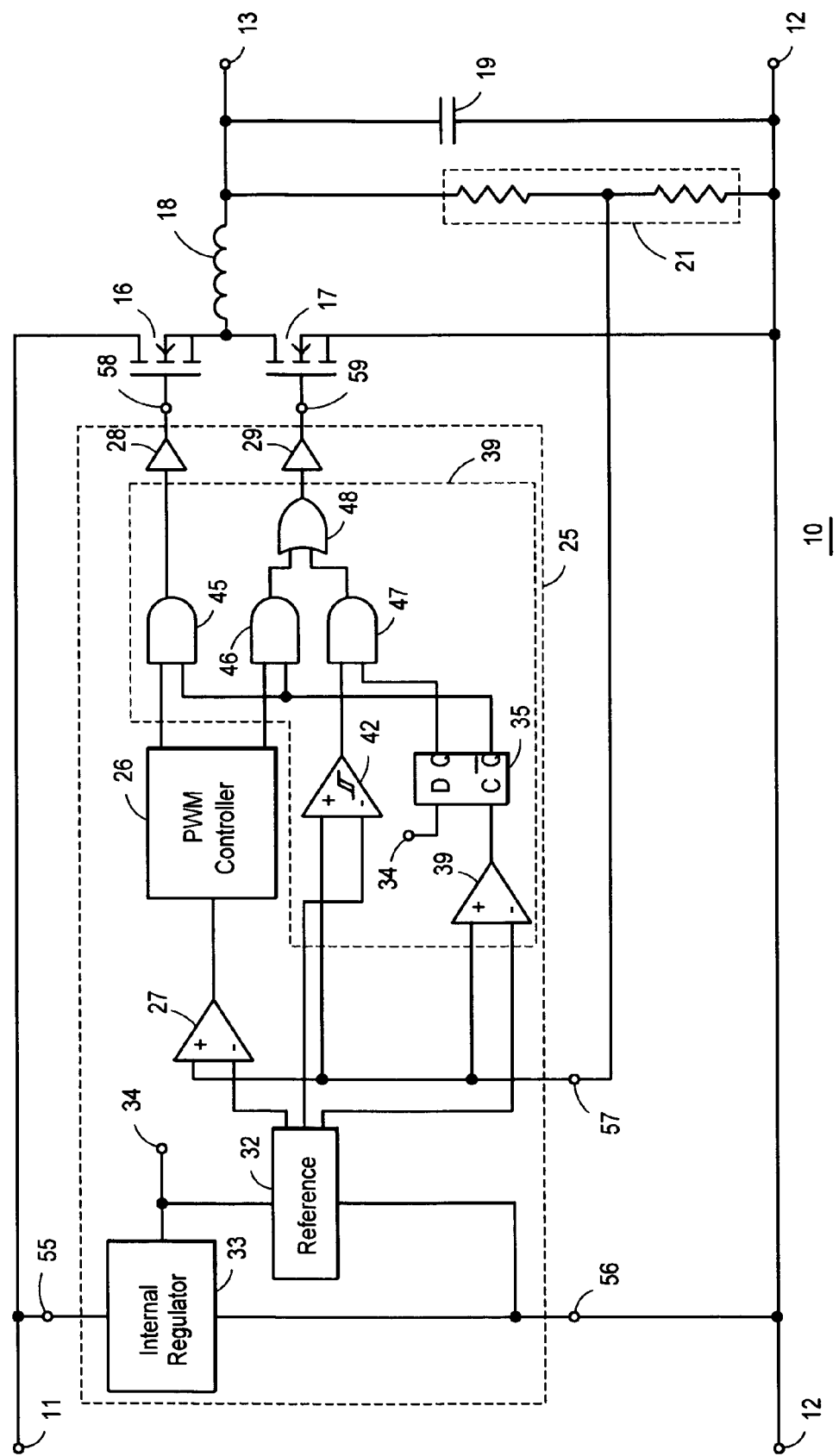
FIG. 1 schematically illustrates a portion of an embodiment of a power supply controller that includes an over-voltage protection circuit in accordance with the present invention.

FIG. 1 schematically illustrates a portion of an embodiment of a power supply system 10 that includes a power supply controller 25. Power supply controller 25 has an over-voltage protection circuit 38 that is configured to prevent the output voltage from going negative due to the over-voltage protection. System 10 receives power between a power input terminal 11 and a power return terminal 12 and responsively provides an output voltage between an output 13 and terminal 12. The input voltage applied between terminals 11 and 12 typically is a DC voltage such as a battery or a rectified sinewave. System 10 includes and upper power switch or upper power transistor 16, a lower power switch or lower power transistor 17, an energy storage inductor 18, an energy storage capacitor 19, and a feedback network 21. Transistors 16 and 17, network 21, inductor 18, and capacitor 19 typically are external to controller 25. In some embodiments, network 21 or transistors 16 and 17 may be included within controller 25. Upper power transistor 16 and lower power transistor 17 are a portion of an output stage of system 10.

Controller 25 includes over-voltage protection circuit 38, an upper transistor driver 28, a lower transistor driver 29, a pulse width modulated (PWM) controller 26, an error amplifier 27, a reference generator or reference 32, and an internal operating voltage regulator or internal regulator 33. Controller 25 is configured to receive an input voltage between a voltage input 55 and a voltage return 56. Input 55 and return 56 generally are respectively connected to terminals 11 and 12. Internal regulator 33 receives the input voltage and forms an internal operating voltage on an output 34 for operating some of the elements of controller 25 amplifier 27, PWM controller 26, reference 32, and including portions of circuit 38. A feedback input 57 of controller 25 is configured to receive a feedback signal from network 21 that is representative of the output voltage. Circuit 38 includes an over-voltage comparator 39, an over-voltage storage element of flip-flop 35, a hysteresis comparator 42, an AND gate 45, an AND gate 46, an AND gate 47, and an OR gate 48. Reference 32 receives the internal operating voltage and generates three different reference voltages that are used for operating amplifier 27 and comparators 39 and 42 of circuit 38. As will be seen further hereinafter, comparator 42 has a hysteresis input that provides an offset between the input voltages that force the output of comparator 42 low and high.

Figure 2:
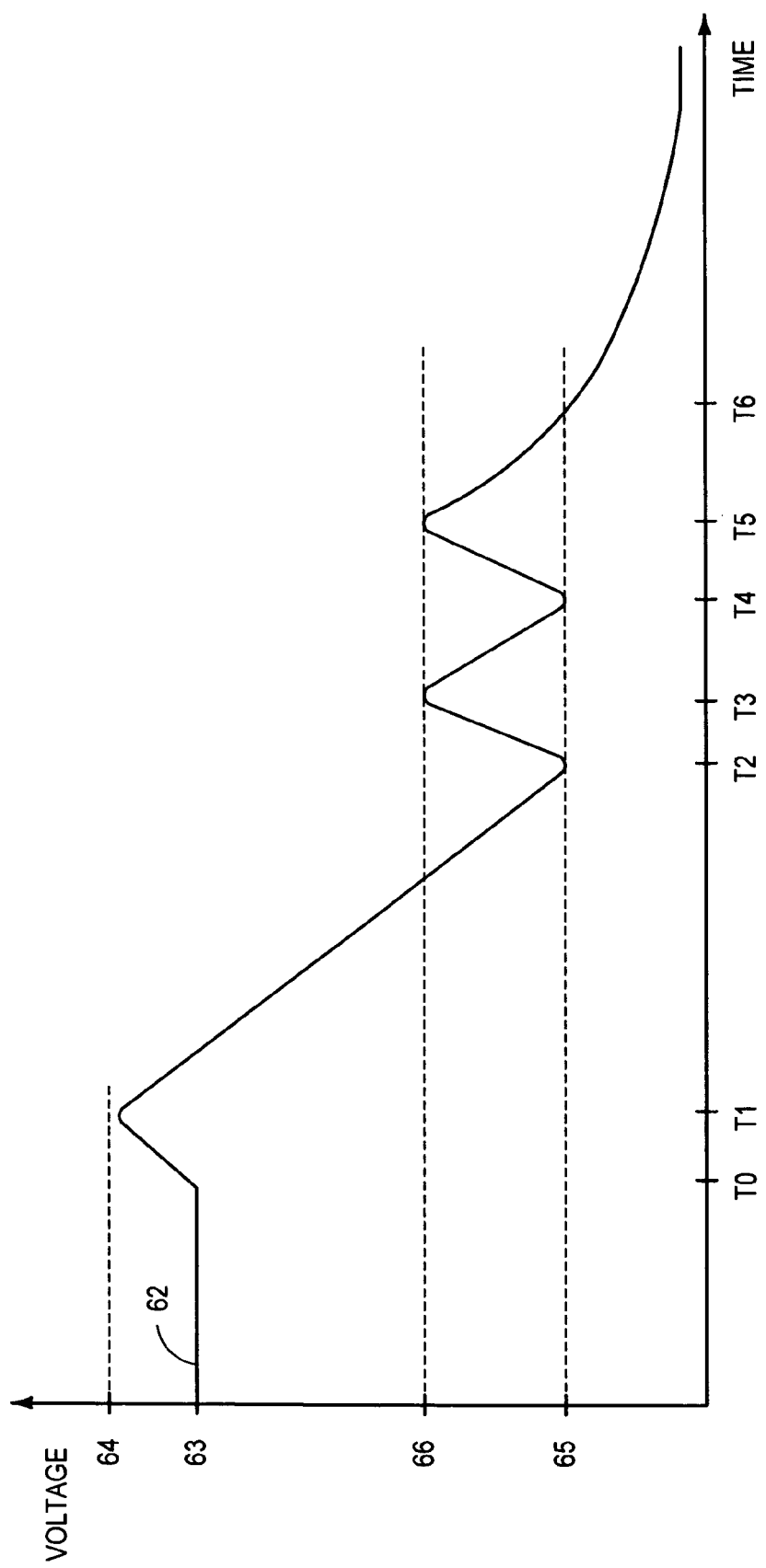
FIG. 2 is a graph having a plot that illustrates various voltages during the operation of the power supply controller of FIG. 1 in accordance with the present invention.
Figure 3:
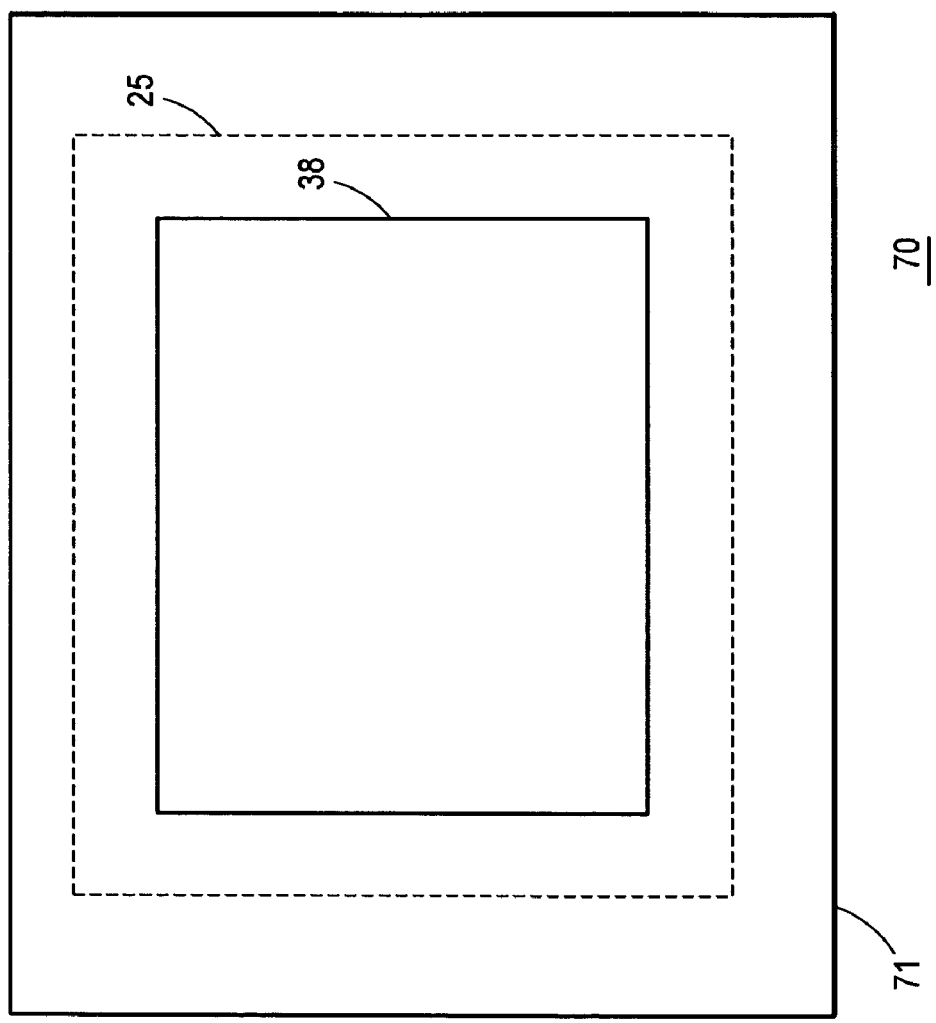
FIG. 3 schematically illustrates an enlarged plan view of a semiconductor device that includes the over-voltage protection circuit of FIG. 1 in accordance with the present invention.

FIG. 2 is a graph having a plot 62 that illustrates the feedback voltage received on input 57 of controller 25. This description has references to FIG. 1 and FIG. 2. During normal operation, the control loop through network 21, amplifier 27, PWM controller 26, circuit 38, drivers 28 and 29, transistors 16 and 17, an inductor 18 regulates the value of the output voltage. Feedback network 21 receives the output voltage and forms the feedback signal that is representative of the value of the output voltage. Error amplifier 27 receives the feedback signal from input 57 in addition to the first reference voltage on a first output of reference 32 and responsively forms an error signal. Controller 26 receives the error signal and responsively generates a first PWM control signal on a first PWM output. The first PWM control signal is formed to enable and disable transistor 16 in order to couple inductor 18 to the input voltage on terminal 11. During normal operation, the Q output of flip-flop 35 is low and the Q bar output is high, thus, gate 45 is enabled to form a first control signal on an output of gate 45 that follows the first PWM control signal. Driver 28 receives the first control signal and provides sufficient current drive to responsively enable and disable transistor 16. Controller 26 also generates a second PWM control signal on a second PWM output that is used to control transistor 17 in order to couple inductor 18 to return terminal 12 and dissipate the energy stored within inductor 18. The low Q output of flip-flop 35 forces the output of gate 47 low and the high Q bar output enables gates 46 and 48 to form a second control signal on an output of gate 48 that follows the second PWM control signal. Driver 29 is used to provide sufficient current drive to enable and disable transistor 17. The normal operation regulates the output voltage and the corresponding feedback voltage to a desired value 63 as by plot 62 (FIG. 2). Such error amplifiers, PWM controllers, and transistor drivers are well known to those skilled in the art.

In some cases, the value of the output voltage on output 13 may increase to a value that is detrimental to the operation of circuit 10 and possibly to the load (not shown) connected between output 13 and terminal 12. For example, system 10 may be temporarily improperly connected in a system and an external high voltage value may be applied to output 13. Such an occurrence is illustrated at a time T0 of plot 62 in FIG. 2. When the increased value of the output voltage on output 13 creates a feedback signal that is greater than a value of the second reference voltage on a second output of reference 32, the output of comparator 39 goes high. This value of the output voltage is referred to as the over-voltage value and is illustrated by a corresponding feedback over-voltage value 64 at a time T1 in FIG. 2. The high from comparator 42 clocks a high into flip-flop 35 forcing the Q output high and the Q bar output low. The low Q bar output forces the output of gate 45 low and blocks the first PWM control signal from affecting the operation of transistor 16. The low output of gate 45 forces the output of driver 28 low and disables transistor 16. The low Q bar output also forces the output of gate 46 low which blocks the second PWM control signal from affecting transistor 17. Comparator 39 and flip-flop 35 function as a detector that provides a disable control signal to block the first and second PWM control signals from the respective first and second control signals. The low output of gate 46 enables gate 47 to control the output of gate 48 and the corresponding second control signal. Since the feedback signal is a high value, the output of comparator 42 is high and the second control signal is also high to enable transistor 17 to conduct current and keep the value of the output voltage low to protect the load and system 10. Transistors 16 remains disabled through the Q bar output of flip-flop 35.

As the value of the output voltage decreases down to a first value that causes the feedback voltage to decrease to a corresponding value 65 (FIG. 2) that is less than the value of the third reference voltage on the third output of reference 32, the output of comparator 42 is forced low. The high Q output of flip-flop 35 enables gate 47 to allow the output of comparator 42 to control the value the second control signal. Thus, the low on the output of comparator 42 forces the second control signal and the output of gates 47 and 48 low thereby disabling transistor 17 through driver 29.

If output 13 remains connected to the high voltage, the output voltage and the feedback signal will again increase. If the output voltage increases to a second voltage value that causes the feedback voltage to increase to a corresponding value 66 (FIG. 2) that is equal to or greater than a fourth reference voltage, that is approximately equal to the third reference voltage plus the value of the hysteresis voltage on the input of comparator 42, the output of comparator 42 again is forced high. The high propagates thorough gates 47 and 48 and driver 29 to force the second control signal high and again enable transistor 17 and protect system 10.

As the output voltage again decreases to the first value, the feedback voltage decreases to value 65 or approximately to the third reference voltage and the output of comparator 42 again goes low to disable transistor 17. This cycle of enabling and disabling transistor 17 continues as long as the over-voltage condition exists on output 13. This alternate enabling and disabling of transistor 17 is illustrated by the alternate increasing and decreasing of the feedback voltage between times T2 and t5 in FIG. 2. If the over-voltage condition is removed, once transistor 17 is again disabled both transistors 16 and 17 stay disabled and the output voltage decreases to approximately zero as illustrated by plot 62 after a time T6.

Disabling transistor 17 before the output voltage becomes zero, facilitates preventing the output voltage from reversing and going below the value of the voltage on return terminal 12. Alternately enabling and disabling transistor 17 during the over-voltage also reduces the power dissipation of system 10. The values of the third and fourth reference voltage values and the corresponding first and second output voltage values are selected so that the first voltage value is sufficiently low to protect system 10 and still prevent the voltage reversal, and so that the second voltage value is low enough to prevent damaging system 10. In one example embodiment, the normal operation output voltage was approximately five volts. The over-voltage value was selected to be approximately ten percent (10%) greater than five volts, the first voltage value was selected to be approximately fifty percent (50%) of five volts or about 2.5 volts, and the second voltage value was selected to be approximately seventy percent (70%) of five volts or about 3.5 volts.

In order to facilitate the functional operation, regulator 33 is connected between input 55 and return 56. Output 34 of regulator 33 is connected to a D input of flip-flop 35 and to supply an operating voltage reference 32. The first output of reference 32 is connected to an inverting input of amplifier 27 which has an output connected to an input of controller 26. The second output of reference 32 is connected to an inverting input of comparator 39. The third output of reference 32 is connected to an inverting input of comparator 42. A non-inverting input of comparator 42 is commonly connected to a non-inverting input of amplifier 27, a non-inverting input of comparator 39, and to input 57. The output of comparator 39 is connected to a clock input of flip-flop 35. The Q output of flip-flop 35 is connected to a first input of gate 47 and the Q bar output is commonly connected to a first input of gate 45 and a first input of gate 46. Second input of gate 45 is connected to the first PWM output of controller 26. The output of gate 45 is connected to an input of driver 28 which has an output connected to output 58. A second input of gate 46 is connected to a second PWM output of controller 25. The output of gate 46 is connected to a first input of gate 48. A second input of gate 48 is connected to the output of gate 47. The output of gate 48 is connected to an input of driver 29 which has an output connected to output 59. The output of comparator 42 is connected to a second input of gate 47. A drain of transistor 16 is connected to terminal 11 and to input 55. A gate of transistor 16 connected to output 58 and a source of transistor 16 is commonly connected to a drain of transistor 17 and to a first terminal of inductor 18. A gate of transistor 17 is connected to output 59 and a source of transistor 17 is connected to return terminal 12 and to return 56. A second terminal of inductor 18 is commonly connected to output 13, a first terminal of capacitor 19, and a first terminal of network 21. A second terminal of capacitor 19 is commonly connected to a second terminal of network 21 and to return terminal 12. The feedback output of network 21 is connected to input 57.

FIG. 2 schematically illustrates an enlarged plan view of a portion of an embodiment of a semiconductor device 70 that is formed on a semiconductor die 71. Circuit 38 is formed on die 71. Die 71 may also include all of controller

25 in addition to other circuits that are not shown in FIG. 1 for simplicity of the drawing. Circuit 38 and device 70 are formed on die 71 by semiconductor manufacturing techniques that are well known to those skilled in the art.

In view of all of the above, it is evident that a novel device and method is disclosed. Included, among other features, is alternately enabling and disabling the lower power transistor as long as an over-voltage condition is present on the output in order to protect system 10 and reduce power dissipation.

While the invention is described with specific preferred embodiments, it is evident that many alternatives and variations will be apparent to those skilled in the semiconductor arts. For example two comparators can be used to set the first and second output voltage values instead of one hysteresis comparator. Also different logic configurations can be used to control the first and second control signals. Although controller 26 is illustrated as a PWM controller, those skilled in the art will realize that other embodiments controller 26 may be a hysteretic controller, a resonant controller, or any controller that is configured to regulate an output voltage based on a particular input voltage. The word "connected" is used throughout for clarity of the description, however, it is intended to have the same meaning as the word "coupled". Accordingly, "connected" should be interpreted as including either a direct connection or an indirect connection.

What is claimed is:

1. An over-voltage protection circuit of a power supply controller comprising:
    a control circuit coupled to receive a first PWM control signal and responsively form a first control signal operable to control a first transistor to control a output voltage and coupled to receive a second PWM control signal and responsively form a second control signal operable to control a second transistor to control the output voltage;
    the control circuit configured to block the first PWM control signal and the second PWM control signal responsively to an over-voltage value of the output voltage;
    the control circuit configured to assert the second control signal and negate the first control signal responsively to a first voltage value of the output voltage that is less than the over-voltage value; and
    the control circuit configured to negate the second control signal and negate the first control signal responsively to a second voltage value of the output voltage that is greater than the first voltage value and less than the over-voltage value.

2. The over-voltage protection circuit of the power supply controller of claim 1 wherein the control circuit configured to assert the second control signal and negate the first control signal includes the control circuit configured to assert the second control signal subsequently to being negated responsively to the over-voltage value.

3. The over-voltage protection circuit of the power supply controller of claim 1 wherein the control circuit configured to assert the second control signal and negate the first control signal includes the control circuit configured to negate the second control signal subsequently to being asserted responsively to the first voltage value.

4. The over-voltage protection circuit of the power supply controller of claim 1 further including a PWM controller configured to generate the first PWM control signal and the second PWM control signal responsively to the output voltage.

5. The over-voltage protection circuit of the power supply controller of claim 4 further including an error amplifier coupled to receive a feedback signal representative of the output voltage and responsively form an error signal wherein the error signal is coupled to the PWM controller.

6. The over-voltage protection circuit of the power supply controller of claim 1 wherein the control circuit configured to block the first PWM control signal and the second PWM control signal responsively to the over-voltage value of the output voltage includes a detector coupled to detect the over-voltage value and responsively block the first PWM control signal from the first control signal and to block the second PWM control signal from the second control signal.

7. The over-voltage protection circuit of the power supply controller of claim 1 wherein the control circuit includes a comparator configured to detect the first voltage value and the second voltage value and to responsively control the first control signal and the second control signal.

8. A method of forming an over-voltage protection circuit of a power supply controller comprising:
    configuring the power supply controller to control an output voltage;
    configuring the over-voltage protection circuit to assert a first control signal to enable a first power transistor of the power supply controller responsively to an over-voltage value of the output voltage;
    configuring the over-voltage protection circuit to subsequently negate the first control signal to disable the first power transistor responsively to a first voltage value of the output voltage; and
    configuring the over-voltage protection circuit to subsequently assert the first control signal to enable the first power transistor responsively to a second voltage value of the output voltage wherein the second voltage value is greater than the first voltage value and less than the over-voltage value.

9. The method of claim 8 further including configuring the over-voltage protection circuit to negate the first control signal to disable the first power transistor responsively to the first voltage value of the output voltage subsequently to enabling the first power transistor responsively to the second voltage value.

10. The method of claim 8 wherein configuring the over-voltage protection circuit to control the output voltage and assert the first control signal to enable the first power transistor responsively to the over-voltage value of the output voltage includes configuring the over-voltage protection circuit to disable a second power transistor responsively to the over-voltage value and to continue disabling the second power transistor while the first control signal is subsequently negated and asserted.

11. The method of claim 8 wherein the over-voltage protection circuit and the power supply controller are formed on a semiconductor die.

12. The method of claim 8 wherein configuring the power supply controller to control the output voltage includes configuring a PWM controller of the power supply controller to generate a first PWM control signal and a second PWM control signal responsively to the output voltage and coupling the first control signal to block the second PWM control signal responsively to the over-voltage value.

13. The method of claim 12 wherein coupling the first control signal to override the second PWM control signal responsively to the over-voltage value includes coupling the first control signal to block the second PWM control signal responsively to the over-voltage value, the first voltage value and the second voltage value.

14. The method of claim 13 wherein configuring the over-voltage protection circuit to subsequently assert the first control signal to enable the first power transistor includes configuring over-voltage protection circuit to disable a second power transistor while enabling the first power transistor.

15. A method of operating an over-voltage protection circuit of a power supply controller comprising:
   detecting an over-voltage value of an output voltage of a power supply system;
   disabling an upper power transistor of an output stage of the power supply system responsively to the over-voltage value; and
   alternately enabling and disabling a lower power transistor of the output stage responsively to respective first and second values of the output voltage.

16. The method of claim 15 wherein disabling the upper power transistor of the output stage of the power supply system responsively to the over-voltage value includes blocking a first PWM control signal from the upper power transistor responsively to the over-voltage value.

17. The method of claim 16 wherein alternately enabling and disabling the lower power transistor of the output stage includes blocking a second PWM control signal from the lower power transistor responsively to the over-voltage value and asserting a control signal to enable the lower power transistor responsively to the first value, and negating the control signal to disable the lower power transistor responsively to the second value.

18. The method of claim 17 including asserting the control signal to enable the lower power transistor subsequently to blocking the first PWM control signal and the second PWM control signal.

19. The method of claim 17 including negating the second control signal to disable the lower power transistor subsequently to asserting the control signal to enable the lower power transistor.

20. The method of claim 15 wherein alternately enabling and disabling the lower power transistor of the output stage responsively to respective first and second values of the output voltage includes alternately enabling and disabling the lower power transistor for multiple cycles and disabling the upper power transistor while alternately enabling and disabling the lower power transistor.

* * * * *